United States Patent [19]
Gorski

[11] 3,804,455
[45] Apr. 16, 1974

[54] SNOWMOBILE FRAME

[76] Inventor: Raymond W. Gorski, 10355 Main St., Findley Lake, N.Y. 14736

[22] Filed: Oct. 4, 1971

[21] Appl. No.: 186,350

[52] U.S. Cl.............. 296/28 J, 180/5 R, 180/30
[51] Int. Cl............................................. B62d 23/00
[58] Field of Search.......... 180/1 R, 5 R, 21, 27, 30; 296/28 J

[56] References Cited
UNITED STATES PATENTS

| | | | |
|---|---|---|---|
| 2,507,421 | 5/1950 | Rose | 180/27 |
| 3,435,907 | 4/1969 | Imhoff | 180/5 R |
| 3,410,357 | 11/1968 | Summers | 180/30 |
| 3,145,797 | 8/1964 | Taylor | 180/21 |
| 2,415,056 | 1/1947 | Wheeler | 180/21 |
| 3,221,830 | 12/1965 | Walsh | 180/5 R |
| 3,373,832 | 3/1968 | Summers | 180/30 |
| 3,550,707 | 12/1970 | Lange | 180/5 R |

*Primary Examiner*—David Schonberg
*Assistant Examiner*—John A. Pekar

[57] ABSTRACT

A vehicle having a tubular U-shaped frame and a gyroscope mounted on the front of said frame. The gyroscope rotates about a vertical axis and will urge the frame of the vehicle to move in a level attitude so that the seat runs in a horizontal plane. The tubular frame is made of a U-shaped member having the closed end of the U at the rear of the vehicle and the front of the vehicle closed by a transverse member. A roll bar is fixed to the front of the frame and a rear roll bar is fixed adjacent the closed end of the U-shaped member. The rear of the U-shaped member is inclined slightly upward and a running board is attached to the sides of the U-shaped member.

1 Claim, 1 Drawing Figure

PATENTED APR 16 1974
3,804,455
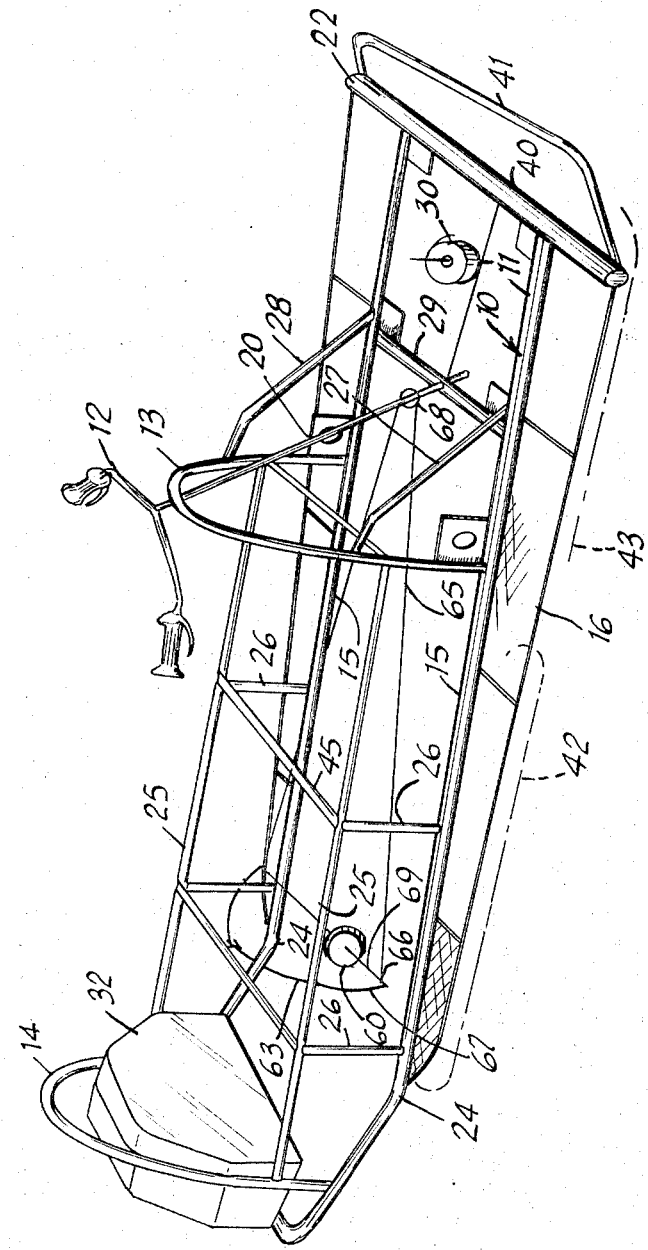
Inventor
RAYMOND W. GORSKI
By
Charles L. Lovelace Attorney

SNOWMOBILE FRAME

OBJECTS OF THE INVENTION

It is an object of the invention to provide an improved vehicle frame.

Another object of the invention is to provide an improved vehicle frame in combination with a gyroscope.

Another object of the invention is to provide a welded tubular steel vehicle frame.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

GENERAL DESCRIPTION OF THE DRAWING

The drawing shows a vehicle frame for use in a snowmobile or the like having a gryoscope shown in schematic form according to the invention.

DETAILED DESCRIPTION OF THE DRAWING

Now with more particular reference to the drawing, the vehicle frame shown is made up of a frame 10 with a main U-shaped frame member 11 having the rear end closed and inclined upwardly slightly at 24 and a conventional type drive track 42 is supported on the bottom of the vehicle frame. A front roll bar 13 is fixed to the intermediate part of the U-shaped frame member and a rear roll bar 14 is fixed to the closed end of the U-shaped frame member. The U-shaped member has side members 15 which are welded to the cross member 22 at the front ends. The side members 25 extend between the two roll bars and are fixed to them. Vertically extending spacer members 26 are attached to the side members 25 and to the U-shaped frame members. The inclined brace members 27 are welded at their lower front ends to the U-shaped members and at their upper ends to the roll bar. The transverse member 28 has its ends welded to the U-shaped tubular member and it provides a seat for the steering column 20. The running boards 16 are welded to the U-shaped frame members and extend from the transverse member 22 rearward. The gyroscope 30 is supported on the U-shaped frame members to rotate about a vertical axis so that it will tend to hold the snowmobile level so that the snowmobile can run up a ramp with one runner on the ramp and the other suspended in mid-air. A second transverse member extends between said side members.

A suitable motor 32 may be supported on the rear of the vehicle as shown, or it could be supported on the front of the vehicle, as desired. The handle bars 12 will be connected to the steering column 20.

The gyroscope 30 is provided to stabilize the vehicle and prevent it from tipping over. The gyroscope 60 is provided to aid in steering the vehicle. The gyroscope 30 rotates about a vertical axis fixed to the vehicle and stabilizes the vehicle and keeps it from tipping over.

Both the horizontal gyroscope 60 and the vertical gyroscope 30 may be driven by a suitable motor to rotate at between 2,000 to 7,000 RPM depending on the size of the gyroscope, the weight of the vehicle, the weight of the gyroscope, and the stabilizing effect desired. Either of the gyroscopes 30 or 60 may be between 12 inches and 26 inches in diameter and weigh from 6 to 30 pounds.

The horizontal gyroscope 60 may have the same dimensions as the vertical gyroscope or they may be made of different characteristics. The horizontal gyroscope 60 rotates about a horizontal axis and it aids in steering the vehicle. The gyroscope 60 is supported on the horizontal axis 61 and is carried on bearings 62. The bearings are carried on a U-shaped yoke 63 which is pivoted at 64 to the frame. The ends 67 of the chain are attached to the ends of the U-shaped yoke and the sprocket 68 is fixed to the steering column 20. Thus when the steering column 20 is rotated to steer the vehicle, the axle 69 is swung in a horizontal plane with the yoke 63 thereby rotating the axis of rotation of the gyroscope and helping steer the vehicle.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A snowmobile having a frame,
   said frame being made of a generally U-shaped tubular member terminating at its front in two ends,
   a transverse member fixed to said ends of said U-shaped tubular member,
   the ends of said transverse member extending laterally out beyond said ends of said U-shaped member,
   a U-shaped front roll bar having its ends fixed to said U-shaped tubular member,
   two spaced side members being fixed at their front ends to said front roll bar and at their rear ends to a rear roll bar, and spaced above said U-shaped tubular member,
   vertically extending spacer members extending from said side members to said tubular member,
   and spaced transverse members extending between said side members,
   and a second transverse member extending between said U-shaped member adjacent the front thereof, a steering column,
   said steering column being supported on said second transverse member,
   and running boards fixed to said U-shaped tubular members and secured to said transverse members and extending outwardly therefrom providing a place for a passenger's feet,
   and expanded metal being supported on said running boards.

* * * * *